United States Patent [19]
Matsuhiro et al.

[11] 4,278,329
[45] Jul. 14, 1981

[54] ELECTROCHROMIC DEVICE WITH TRANSMISSIVE COUNTER ELECTRODE

[75] Inventors: Kenzi Matsuhiro, Sagamihara; Yasushi Masuda, Yamato, both of Japan

[73] Assignee: Ashai Glass Company, Ltd., Tokyo, Japan

[21] Appl. No.: 45,664

[22] Filed: Jun. 5, 1979

[30] Foreign Application Priority Data

Jun. 20, 1978 [JP] Japan ................................. 53-73741
Jun. 20, 1978 [JP] Japan ................................. 53-73742
Jun. 30, 1978 [JP] Japan ................................. 53-78723

[51] Int. Cl.³ .............................................. G02F 1/17
[52] U.S. Cl. .............................................. 350/357
[58] Field of Search ........................ 350/357; 29/570

[56] References Cited

U.S. PATENT DOCUMENTS

4,182,551  1/1980  Washida et al. ................. 350/357

OTHER PUBLICATIONS

Schirmer et al., "Dependence of $WO_3$ Electrochromic Absorption on Crystallinity" J. Electrochem. Soc.: Solid-State Science and Technology, May 1977, pp. 749-753.

*Primary Examiner*—James W. Davie
*Attorney, Agent, or Firm*—Oblon, Fisher, Spivak, McClelland & Maier

[57] ABSTRACT

An improved counter electrode used in an electrochromic device is transmissive in both charge injection and extraction states and exhibits excellent reversibility whereby it is optimum as a counter electrode in a transmissive electrochromic device which is useful as a display device in its control of visible and infrared absorption by a window and the like.

6 Claims, 13 Drawing Figures

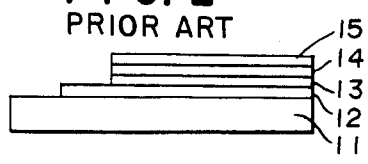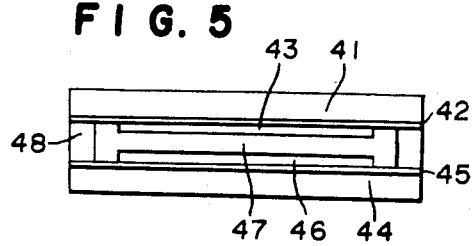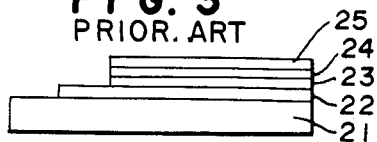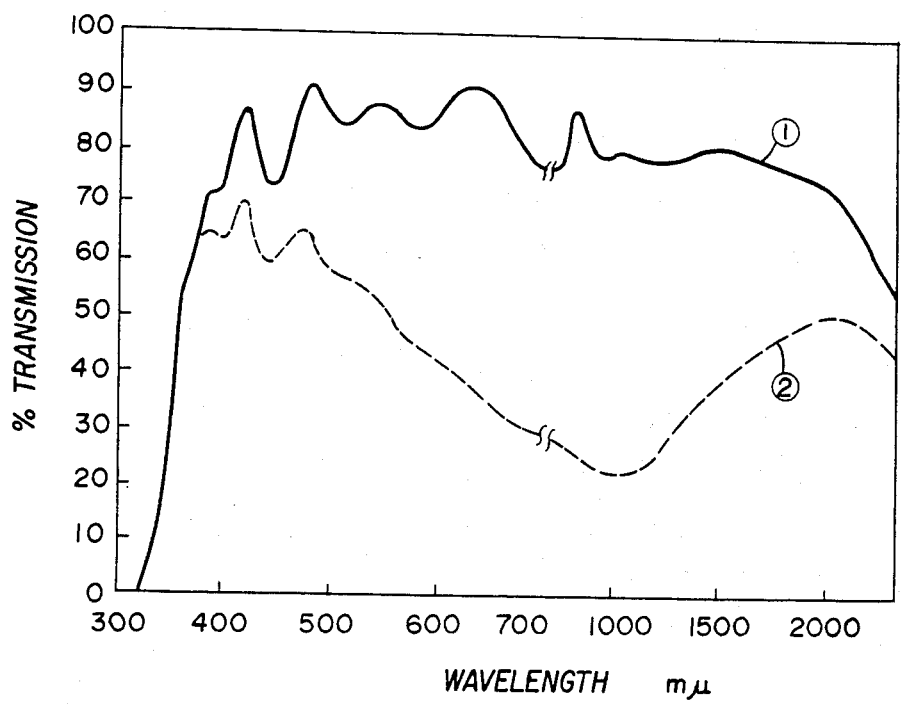

ELECTROCHROMIC DEVICE WITH TRANSMISSIVE COUNTER ELECTRODE

BACKGROUND OF THE INVENTION

1. Field of the Invention

The present invention relates to a counter electrode used in an electrochromic device. More particularly, it relates to a counter electrode in which an optical property in visible region is not substantially changed though reversible change of ions and electrons is caused by controlling its electric field and it also relates to a transmissive electrochromic device using the same.

2. Description of Prior Arts

Heretofore, certain electrochromic devices using a tungsten oxide film have been proposed.

It has been illustrated that color centers are formed by the following equation by biasing the tungsten oxide film in negative

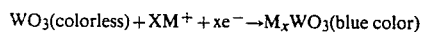

wherein $M^+$ designates a proton, an alkali metal ion or silver ion.

Such electrochromic devices are classified into a liquid type and a solid type. In the former system, the display electrode faces the counter electrode and a liquid electrolyte is filled between them.

In the structures of the electrochromic devices, symmetric and asymmetric devices have been proposed. The symmetric device comprises a transparent substrate (1) having a transparent conductive film (2) and a transparent substrate (4) having a conductive film (5), electrochromic films (3), (6) which are respectively formed on the conductive films (2) or (5) and an electrolyte (7) which is kept between the pair of the substrates and is sealed by sealant (8), as shown in FIG. 1. The asymmetric device comprises an inactive electrode substance such as a metal and carbon as the counter electrode.

Now, the inactive electrode has been considered not to be enough in view of its life. It is usual to employ the symmetric device.

In the symmetric device, the tungsten oxide film is formed on the display electrode and the counter electrode. Accordingly, the tungsten oxide film of the counter electrode is the colored state even though no display is performed. In order to obstruct the coloring state from an observer, a masking material (9) has been required.

Accordingly, the electrochromic device using a counter electrode made of an amorphous tungsten oxide must be a reflective type device.

In the latter device, a display electrode faces a counter electrode and a solid insulating film which injects ions only is located between the electrodes.

A device shown in FIG. 2 comprises a transparent substrate (11) having a tungsten oxide film (13), an ion permeable insulating film (14) made of $CaF_2$ and a counter electrode (15) of gold film. Since the gold film is used as the counter electrode (15) of the device, its transmission is inferior. Moreover, any reversible process is not be given as the reaction of the counter electrode (15) whereby a gas is generated to shorten its life, disadvantageously.

A device shown in FIG. 3 comprises a transparent substrate (21) having a transparent conductive film (22), a tungsten oxide film (23), an ion permeable insulating film (24) made of $RbAg_4I_5$ which transmits silver ions, and a counter electrode (25) of silver film.

In the device, the reaction of $Ag \rightarrow Ag^+ + e$ is caused on the counter electrode whereby balance of the charges can be maintained. However, $RbAg_4I_5$ is not stable. Silver ions are discharged on the display electrode whereby it is disadvantageously deposited in dentrite form. Moreover, a size of silver ion is large whereby a response is disadvantageously slow.

A device shown in FIG. 4 comprises a transparent substrate (31) having a transparent conductive film (32), a tungsten oxide film (33), an ion permeable insulating film (34) of chromia and a counter electrode (35) of gold film.

In the device, protons derived from a small amount of water in the chromia are used as the carrier of charge. Since the gold film is used as the counter film, its transmission is disadvantageously low.

SUMMARY OF THE INVENTION

It is an object of the present invention to provide a counter electrode having improved reversibility and longer useful life in its current feeding.

It is another object of the present invention to provide a transmissive electrochromic device using said counter electrode.

The foregoing and other objects of the present invention have been attained by providing a counter electrode in which optical property in the visible region is not substantially changed though reversible change of ions and electrons is caused by a control of its electric field. In particularly, the objects have been attained by using a crystalline tungsten oxide having porous structure formed by a vacuum evaporation method in a vacuum degree of $5 \times 10^{-4}$ to $2 \times 10^{-3}$ torr on a transparent conductive film and a baking at 350° to 450° C.

BRIEF DESCRIPTION OF THE DRAWINGS

FIG. 1 is a sectional view of a conventional liquid type electrochromic device;

FIGS. 2 to 4 are respectively sectional views of conventional solid type electrochromic devices;

FIG. 5 is a sectional view a liquid type electrochromic device of the present invention;

FIG. 6 is a spectrography of an amorphous tungsten oxide;

DETAILED DESCRIPTION OF THE PREFERRED EMBODIMENTS

Figure 7:
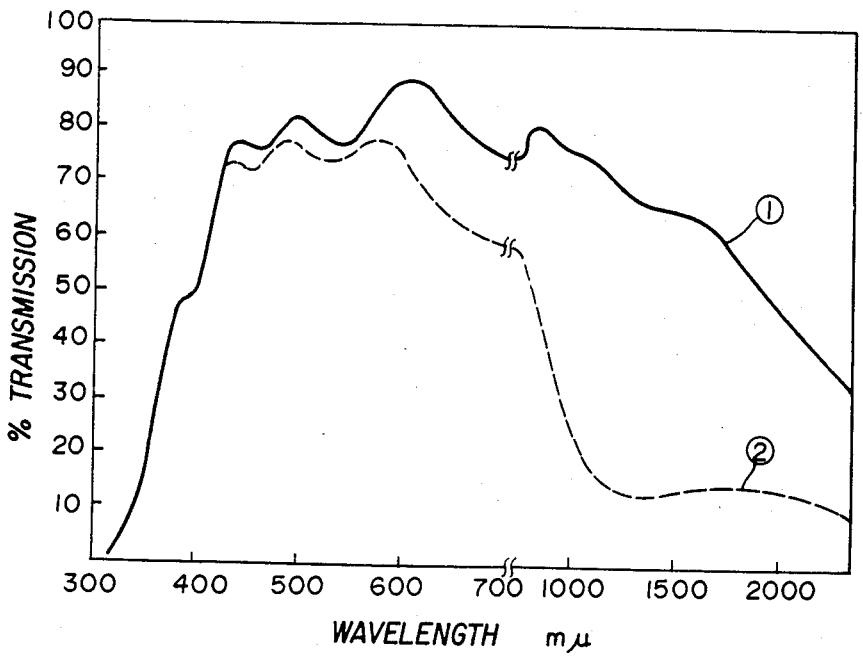
FIG. 7 is a spectrography of a crystalline tungsten oxide.

The counter electrode of the present invention has characteristic that its optical changeable wavelength region is substantially out of the visible region and its optical change is not substantially observed in a state absorbing ions and electrons by controlling electric potential, and also has excellent reversibility.

The counter electrode of the present invention basically has the following properties.

(1) It has a porous structure for diffusing ions under the control of an electric potential.

(2) It has mobility so that electrons for compensating the charge of diffused ions are drifted to reach near ions.

(3) Color centers are formed by mutual action of mother lattice, ions and electrons.

(4) It has crystalline property so that electrons trapped in color centers can be non-localized in relatively high degree. The color centers have no visible absorption.

The counter electrode of the present invention will be illustrated by an example of tungsten oxide.

The tungsten oxide film can be formed by a conventional E.B. method or a resistance heating method in a conventional vacuum evaporation apparatus. It can be also formed by a conventional sputtering method. The condition for forming the fabrication of the film is depending upon kind of the method. In a vacuum evaporation method, the vacuum degree is preferably ranging from $1 \times 10^{-4}$ torr to $5 \times 10^{-3}$ torr especially ranging from $5 \times 10^{-4}$ torr to $2 \times 10^{-3}$ torr. In a sputtering method, the vacuum degree is preferably ranging from $3 \times 10^{-2}$ torr to $2 \times 10^{-1}$ torr. The film formed in such condition is porous and amorphous in its structure. The film formed by the vacuum evaporation is preferable for the purpose of the present invention, because it has more porous structure than that of the sputter method. The film just after forming has an electrochromic characteristic which is found for its amorphous film. When the film is baked at a desired temperature such as from 350° C. to 450° C. for the tungsten oxide film, the film is substantially crystallized and the electrochromic characteristic is substantially varied from the characteristic of the amorphous tungsten oxide film. The main region of optical change caused by injection of ions and electrons is shifted to the near infrared region. The optical change is not substantially caused in the visible region. The coloring and bleaching response speed and its reversibility in the application of voltage are remarkably superior to those of the former.

In the counter electrode of the present invention, the main wavelength region for optical change caused by injection of ions and electrons by the application of voltage is shifted to the near infrared region from that of the amorphous tungsten oxide film whereby its optical change is not substantially observed as the visible change. The reversible change in the application of voltage is perfect.

The counter electrode of the present invention has both characteristics of the easy ion injection and extraction which is substantially the same with that of the amorphous tungsten oxide and the optical property of the crystalline tungsten oxide film as described above. The counter electrode can be prepared by the heat-treatment (baking) followed by the vacuum evaporation method or the sputter method as described above. These methods are not critical. It is also possible to form a film having similar characteristic by forming the film on a heated substrated. The substance for the film is not only tungsten oxide but also a composition of tungsten oxide and an additive such as $Ta_2O_5$, $MoO_3$ and $V_2O_5$ or a substance which reversibly injects and extracts ions and electrons between an ion containing layer and the conductive film by a control of electric potential whereby its optical property is changed.

The electrochromic device having the counter electrode will be illustrated.

When the counter electrode of the present invention is used in the liquid type electrochromic device, it is unnecessary to use a masking material whereby the structure of the electrochromic device can be simplified and it can be easily prepared. This is a transmissive electrochromic device whereby it is possible to illuminate from its reverse side to be easily read as display device. It is possible to impart coloring of its background by disposing a backboard.

FIG. 5 shows one embodiment of the transmissive electrochromic device of the present invention. An electrochromic film (43) is formed on a transparent substrate (41) having a transparent conductive film (42). The electrochromic film can be an amorphous tungsten oxide film formed by the conventional method such as E.B. vacuum evaporation method.

On the other hand, a counter electrode is prepared by forming a transparent conductive film (45) on a transparent substrate (44) and then, forming a crystalline tungsten oxide film on it.

The pair of the substrates are sealed by a sealant to give a predetermined space, and an electrolyte (47) is filled in the space. The electrolyte can be known one and preferably a solution prepared by dissolving a salt containing proton or a monovalent ion such as alkali metal ion, silver ion and thallium ion, in an organic solvent such as propylenecarbonate, acetonitrile, dimethylsulfoxide and N-methyl pyrrolidone.

When a voltage is applied to the electrochromic device of the present invention to give negative for the display electrode (42), ions and electrons are injected in the amorphous tungsten oxide film to cause the following reaction whereby blue color is imparted in the appearance of the device.

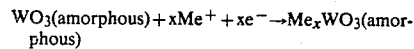
$WO_3(amorphous) + xMe^+ + xe^- \rightarrow Me_xWO_3(amorphous)$

FIG. 6 ① shows the spectrography of the injection state.

When the polarity is reversed to give negative for the counter electrode, the reverse reaction to the above-mentioned reaction, is caused whereby the blue color is changed to colorless.

FIG. 6 ② shows the spectrography of the extraction state.

On the other hand, in the counter electrode, the following reaction is performed to result injection and extraction of the charge equivalent to that of the display electrode, whereby the charges are balanced to be stable reaction.

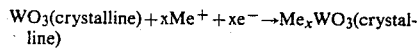
$WO_3(crystalline) + xMe^+ + xe^- \rightarrow Me_xWO_3(crystalline)$

However, the optical change on the counter electrode is not visible whereby the device is colorless.

FIG. 7 ① shows the spectrography in the state before this reaction.

FIG. 7 ② shows the spectrography in the state after the reaction.

Figure 8:
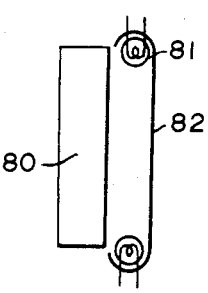
FIGS. 8 to 11 are respectively, applications of the electrochromic device of the present invention.
Figure 9:
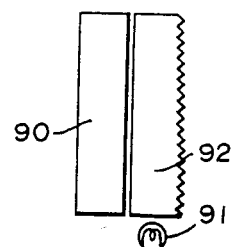
Figure 10:
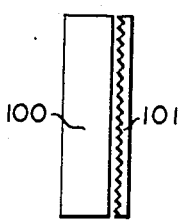
Figure 11:
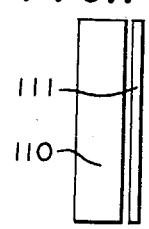

The ions and electrons are reversibly injected and entered in the counter electrode of the electrochromic device of the present invention, however, an optical change in the visible region is not caused. Accordingly, it is possible to illuminate by locating a light source (81) and a reflecting plate (82) behind the electrochromic device (80) as shown in FIG. 8. It is also possible to illuminate by locating a light (91) and a light scattering plate (92) behind the electrochromic device (90) as shown in FIG. 9. It is also possible to be a reflective electrochromic device by locating a light scattering reflective plate (101) such as paper and metal plate behind the electrochromic device (100) as shown in FIG. 10. It is also possible to improve displaying effect with a color of background by locating a color backboard (111) behind the electrochromic device (110) as shown in FIG. 11.

The solid type electrochromic device having the counter device of the present invention will be illustrated.

Figure 12:
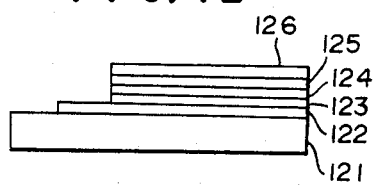
FIG. 12 is a sectional view of a solid type electrochromic device of the present invention.

FIG. 12 shows one embodiment of the solid type transmissive electrochromic device of the present invention.

A transparent conductive film (122) such as indium oxide and tin oxide is formed on the transparent substrate (121) and then, an electrochromic film (123) is formed on it as a counter electrode. In the electrochromic film, reversible injection and extraction of anions and electrons for compensating the charges can be caused but its optical property in the visible region is not substantially changed.

An insulating film (124) is formed on the electrochromic film (123) as the counter electrode. In the insulating film, anions can be injected but electrons are not substantially injected.

The ion permeable insulating film (124) can be made of calcium fluoride, lead (II) fluoride, silicon oxide, chromia, β-alumina, lithium nitride, lithium aluminate, lithium silicate, lithium zinc gelmanate, lithium magnesium gelmanate, etc.

The solid type transmissive electrochromic device can be prepared by forming an electrochromic film (125) as a display electrode in which reversible injection and extraction of anions and electrons for compensating the charges can be caused and its optical property in the visible region is changed, and also a transparent conductive film (126) on the above-mentioned insulating film (124).

When the electrochromic film (125) as the display electrode is biased in negative, anions and electrons for compensating the charges are injected to form color centers in the combination of the mother lattice, the anions and the electrons.

The electrochromic film can be made of an oxide or a sulfide of a metal such as tungsten, rhenium, vanadium, niobium, tantalum, chromium, manganese and titanium, especially an amorphous film containing tungsten oxide.

In order to operate reversibly the solid type transmissive electrochromic device, it is necessary to inject anions and electrons for compensating the charge of the anions, in one of the electrochromic film (123) as the counter electrode or the electrochromic film (125) as the display electrode.

In view of the preparation, it is preferable to inject anions in the electrochromic film (123) as the counter electrode. The electrochromic film (123) as the counter electrode is formed on a transparent substrate (121) having the transparent conductive film (122). This is immersed in an electrolyte containing anions and a voltage is applied to inject the anions.

Figure 13:
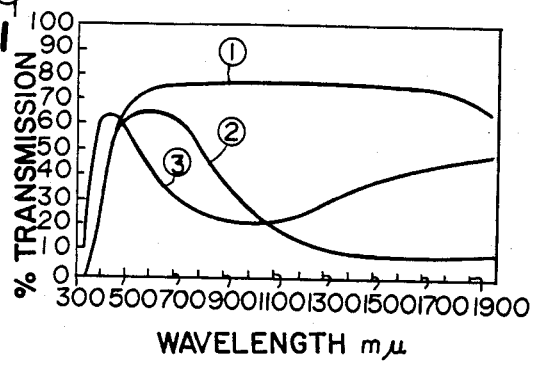
FIG. 13 is a spectrography of the counter electrode of the present invention.

Referring to FIG. 13, transmission characteristic in the operation will be illustrated for one example of the electrochromic device prepared by using electrochromic film (123) of a crystalline tungsten oxide having porous structure in which Li ions and electrons are injected, as the counter electrode and using amorphous tungsten oxide film (125) as the display electrode.

FIG. 13 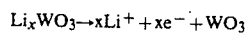 shows the spectrography of the electrocromic film (125) as the display electrode in the state of non-application of voltage.

FIG. 13 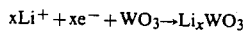 shows the spectrography of the electrochromic film (123) as the counter electrode. This is the transmissive electrocromic device.

When a voltage is applied to give negative for the display electrode and to give positive for the counter electrode, the following reaction is caused in the electrochromic film (123) as the counter electrode, to form free Li ions.

$$Li_xWO_3 \rightarrow xLi^+ + xe^- + WO_3$$

The following reaction is caused in the electrochromic film (125) as the display electrode, to form $Li_xWO_3$ and to impart blue color.

$$xLi^+ + xe^- + WO_3 \rightarrow Li_xWO_3$$

FIG. 13 ③ shows the spectrography in this state.

When a voltage is applied to give negative for the counter electrode and to give positive for the display electrode, the reverse reactions to the above-mentioned reactions are caused to be colorless in the device.

As described above, the reversible injection and extraction of electrons is resulted in both electrochromic films as the display electrode and as the counter electrode, whereby the balance of the charges is maintained to prevent deterioration.

The electrochromic device of the present invention can be used as a display device and also optical changeable glasses for a curtainless window, an antidazzling mirror for a car, a light quantity variable sunvisior and a light quantity variable glasses.

The present invention will be further illustrated by certain examples and references which are provided for purposes of illustration only and are not intended to be limiting the present invention.

EXAMPLE 1

In a vacuum evaporation apparatus equipped with a rotary pump and an oil diffusion pump, a transparent glass substrate coating a transparent conductive film was set. It was evacuated to $10^{-6}$ torr and then, $N_2$ gas was leaked to reduce the vacuum degree to $6 \times 10^{-4}$ torr. The vacuum evaporation was started. A powdery tungsten oxide was used as a raw material. An electron gun having an accelerating voltage of 10 kV was used for heating it. Thus, a tungsten oxide film having a thickness of about 0.5μ was prepared (Sample 1).

Sample 1 was baked at 390° C. for 30 minutes in air and gradually annealed. According to an analysis of a structure, it was confirmed that the tungsten oxide film obtained by the baking was crystallized. (Sample 2)

Spectrographies of Sample 1 and Sample 2 were respectively measured by using a propylenecarbonate containing $LiClO_4$ at a concentration of 1 mole/liter as an electrolyte and passing current at a coulomb of 10 mc/cm².

FIG. 6 shows spectrographies of Sample 1 having an amorphous tungsten oxide film ① before and ② after passing the current.

FIG. 7 shows spectrographies of Sample 2 having a crystalline tungsten oxide film of the present invention ① before and ② after passing the current.

In the case of Sample 2, the main region for optical changes caused by the absorption of ions and electrons is shifted to near infrared region. The optical change is not substantially caused in visible region.

Sample 1 was treated at a coulomb of 10 mC/cm² to be the colored state and used as one electrode. Sample 2 was used as a counter electrode. The pair of the electrodes were arranged to face each other in an electrolyte of propylenecarbonate containing LiClO₄ at a concentration of 1 mole/liter. An induced optical density resulted by applying voltage; its coloring and bleaching speed; and reversibilities of the coloring and bleaching speed and electrode reaction in its coloring and bleaching time were tested. When a voltage of 1.5 V was applied between the crystalline tungsten oxide film (negative) and the amorphous tungsten oxide film (positive), the color of the amorphous tungsten oxide in the colored state disappears and the color of the crystalline tungsten oxide was not substantially changed to be colorless transparent. The current meter showed the fact of en electrode reaction. The coulometer showed the fact transferring the charge at a coulomb of 10 mC/cm². When the polarity was reversed, the amorphous tungsten oxide film was colored and the current was passed. The coulometer showed the fact transferring the charge at a coulomb of 10 mC/cm². The response time was high enough and was substantially the same as the response time of the amorphous tungsten oxide in the combination of the amorphous tungsten oxide films.

EXAMPLE 2

In a vacuum evaporation apparatus equipped with a conventional electron gun, a tungsten oxide film having a thickness of about 0.5μ was formed on a glass substrate having a transparent conductive film in a vacuum degree of $2 \times 10^{-5}$ torr. The product was used as a display electrode. A tungsten oxide film having a thickness of about 1.0μ was formed on a glass substrate in a vacuum degree of $6 \times 10^{-4}$ torr by the same process and the product was baked at 390° C. for 20 minutes in air. The product was used as a counter electrode.

The pair of the electrodes were arranged to face each other and a spacer was held between them at their peripheral part to seal them. An electrolyte obtained by dissolving LiClO₄ in propylenecarbonate at a concentration of 0.5 M/liter, was filled in the sealed electrodes from an inlet and the inlet was sealed to prepare an electrochromic device. A voltage of 3.5 V was applied between the display electrode (negative) and the counter electrode (positive). The amorphous tungsten oxide film on the display electrode was changed to be blue color. When a voltage of 1.5 V was applied between the display electrode (positive) and the counter electrode (negative), the blue color of the display electrode disappears. The crystalline tungsten oxide film on the counter electrode was not substantially changed by observation. The switching was repeated in 1.5 V whereby the coloring and the bleaching of the tungsten oxide on the display electrode were repeated. The tungsten oxide on the counter electrode was not changed. The transmissive electrochromic device was obtained. Any change of the device was observed and the device was actuated after switching for 300,000 times.

What is claimed is:

1. In an electrochromic device comprising two transparent substrates, each having formed thereon a transparent conductive film which face each other; first and second electrochromic films which are formed on the transparent conductive films; an electrolyte containing ions capable of changing the optical properties of the electrochromic film and a sealant for sealing the electrolyte between the two substrates, wherein the improvement comprises:

said first electrochromic film being formed of a substance whose optical properties in the range of visible light change in response to the injection and extraction of said ions; and said second electrochromic film being formed of a substance whose optical properties in the range of visible light do not change in response to the injection and extraction of said ions.

2. An electrochromic device according to claim 1 wherein said second electrochromic film is a crystalline tungsten oxide film having porous structure formed by depositing by a vacuum evaporation in a vacuum degree of from $5 \times 10^{-4}$ to $2 \times 10^{-3}$ torr on the transparent conductive film and baking at from 350° to 450° C.

3. An electrochromic device according to claim 1 wherein said first electrochromic film is an amorphous film containing tungsten oxide and said second electrochromic is a crystalline film containing tungsten oxide.

4. An electrochromic device having a laminated structure comprising:

a transparent substrate;

a first electrochromic film made of a substance having the property that a reversible injection and extraction of anions and electrons does not change its optical properties in the range of visible light;

an insulating film in which anions may be injected, but electrons may not be substantially injected;

a second electrochromic film made of a substance having the property that a reversible injection and extraction of anions and electrons does change its optical properties in the range of visible light; and a transparent conductive film.

5. An electrochromic device according to claim 4 wherein said first electrochromic film is a crystalline film containing tungsten oxide which has a porous structure being capable of injection and extraction of ions.

6. An electrochromic device according to claim 4 wherein said second electrochromic film is an amorphous film containing tungsten oxide which has a porous structure being capable of injection and extraction of ions.

* * * * *